United States Patent [19]

Holy et al.

[11] Patent Number: 4,635,329
[45] Date of Patent: Jan. 13, 1987

[54] TOOL HOLDER ASSEMBLY FOR MACHINE TOOLS

[75] Inventors: Franz Holy, Stockerau; Karl Steiner, Vienna, both of Austria

[73] Assignee: Maschinenfabrik Heid Aktiengesellschaft, Vienna, Austria

[21] Appl. No.: 667,263

[22] Filed: Nov. 1, 1984

[30] Foreign Application Priority Data

Nov. 30, 1983 [AT] Austria ................................. 4186/83

[51] Int. Cl.[4] .......................... B23B 7/04; B23C 1/12
[52] U.S. Cl. ....................................... 29/27 C; 29/39; 82/36 A; 409/216
[58] Field of Search ................. 29/27 C, 27 R, 39, 40, 29/36; 409/144, 215, 216, 211, 201; 408/35; 82/25, 36 A, 36 R; 901/6

[56] References Cited

U.S. PATENT DOCUMENTS

| Re. 31,288 | 6/1983 | Matsuzaki et al. | 29/27 C |
|---|---|---|---|
| Re. 31,304 | 6/1983 | Tsukiji | 29/27 C |
| 1,227,486 | 5/1917 | Newman et al. | 82/36 A |
| 2,605,538 | 8/1952 | Cuttat | 29/39 |
| 3,295,415 | 1/1967 | Muller | 409/144 |
| 3,448,656 | 6/1969 | Bottger et al. | 409/215 |
| 3,712,175 | 1/1973 | Muller et al. | 409/144 |
| 4,058,034 | 11/1977 | Laitm et al. | 82/36 A |
| 4,297,925 | 11/1981 | Ishizuka et al. | 82/36 A X |
| 4,404,727 | 9/1983 | Zankl | 29/568 |

FOREIGN PATENT DOCUMENTS

| 138412 | 10/1979 | German Democratic Rep. | 901/6 |
|---|---|---|---|
| 2120965 | 12/1983 | United Kingdom | 29/27 C |

*Primary Examiner*—William R. Briggs
*Attorney, Agent, or Firm*—Karl F. Ross; Herbert Dubno

[57] ABSTRACT

In machine tools, for selective utilization of fixed tools, or tools which are adapted to be driven and rotated, a common tool retainer is provided in the toolhead. The toolhead comprises a spur gear or similar driver, or comprises drive components for operatively engaging a rotating tool. The toolhead is adapted to be rotated about an axis which is disposed at an angle of 45° with respect to the main axis and the transverse axis of the machine tool and which intersects the line of intersection of the tool carrier planes which extend parallel to the longitudinal and transverse planes. A journal arrangement for the driven tools is installed in the tool retainer itself, or in the toolhead.

5 Claims, 6 Drawing Figures

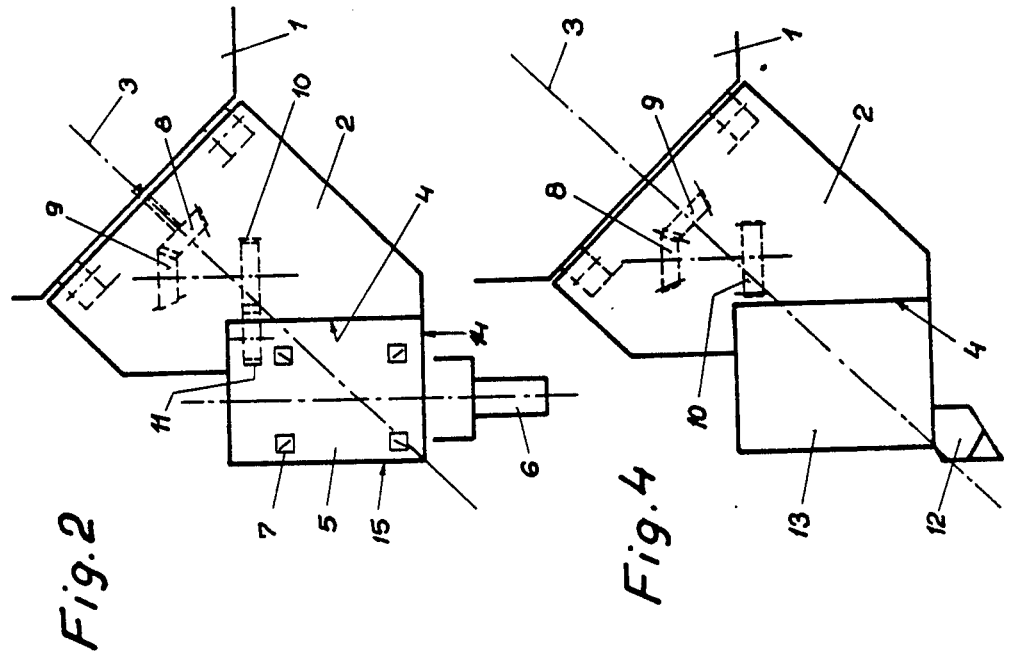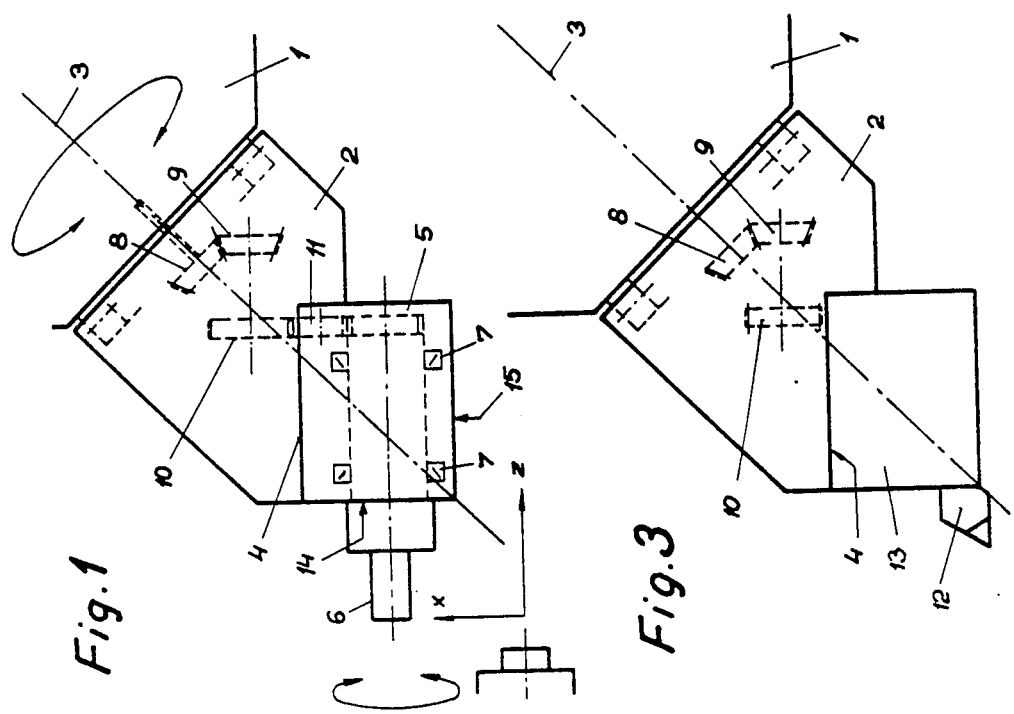

TOOL HOLDER ASSEMBLY FOR MACHINE TOOLS

FIELD OF THE INVENTION

The present invention relates to a tool holder assembly or toolhead for securing tool members on machine tools, for the utilization of lathe tools (e.g. rotatable tool bits), and for the mounting of drilling and milling tools.

BACKGROUND OF THE INVENTION

Lathces shape a rotating workpiece with a tool, for example, a nonrotating tool bit, boring bit, or similar cutting tool or cutter, which is exclusively moved in cooperating manner with respect to the workpiece by an advancing device i.e. the tool slide which can have a cross feed and can carry a tool post. Many machining operations, however, require an additional tool, such as a milling head or a drilling tool, for example. When shaping a shaft or similar workpiece, a groove intended for a key or the like therein can be produced by milling of the corresponding groove opening. This machining operation can be carried out after removing the workpiece from the lathe and by securing or chucking it in a milling machine.

In order to avoid such laborious exchanges or workpiece transfers, it has been suggested to provide so-called machining or production centers which allow a relatively universal machining of the desired workpiece configuration by lathe operation, as well as by milling and drilling. Recently, a machine tool of this type has been suggested which includes a toolhead arrangement for holding a desired tool and having tool retaining devices for cutters and a further device for rotating tools, such as, for example, milling heads and drilling spindles. The toolhead is swung or rotated for the tool exchange operation through an arc of 180°, and the tool in use is thereby swung away from the workpiece. Since the toolhead has two separate devices, one each respectively for a fixed tool and for a rotating tool, with each movement of the toolhead - i.e. during the tool exchange, as well as during longitudinal or planar movements with respect to one production position - care must be taken that collisions of parts of the machine or a part of the machine with the workpiece are avoided. When one assumes that the one tool retainer device is equipped with a cutter, or a tool holder and cutter, and the other tool retainer device is equipped with a drill rod of wide working range, it is clear that the latitude of the toolhead is considerably restricted. When one tool is removed, and the respective retainer is left empty, such retainer is prone to accumulate dirt, for example, turnings or similar chips, and the machine is liable to be disrupted in its functioning. Thus covers are necessary for the exposed parts.

OBJECTS OF THE INVENTION

It is therefore an object of the present invention to avoid the aforementioned, as well as other drawbacks of hitherto known tool holders for machine tools.

It is also an object of the present invention to provide an improved toolhead arrangement for machine tools.

Yet another object is to provide an improved tool holder for a machine tool, especially a lathe, which is more versatile than earlier tool holders.

SUMMARY OF THE INVENTION

The above objects are attained by the provision of a tool holder for a production or machining center, which tool holder can accommodate fixed (i.e. nonrotatable) lathe cutters or bits, as well as rotating tools.

In accordance with one aspect of the invention there is provided a toolhead which has a single tool post or tool retainer for a tool carrier or tool clamp for fixed or rotating tools, or for directly mounting fixed or rotating tools, and the tool post or tool retainer is provided with a drive gear wheel or drive components for coupling the rotating tools. Through provision of one, and only one, tool retainer, which is adapted to have arranged thereon rotating as well as nonrotating tools, there is always only one tool present at the toolhead. The limitations with respect to movements of the toolhead and the tool slide as a result of collisions with a second tool are eliminated. The sequence of movements is not hindered. As well, the problem of covering the openings, or guides, respectively, in the case of an empty retainer does not arise.

We preferably provide a toolhead which can be mounted on the cross slide and which is formed with a seat provided with tool-drive gearing, the seat selectively receiving either a nonrotatable-tool carrier or a rotatable-tool carrier, the latter having tool-rotating gearing meshing with the tool-drive gearing of the head. Any conventional means can be used to detachably retain the carriers in the seat.

In accordance with another aspect of the invention, the toolhead is adapted to be rotated about an axis which is at an angle of 45° with respect to the main axis (z-axis) of the machine tool and the transverse axis or plane axis (x-axis), and intersects the line of intersection of the tool retainer or holder planes which extend parallel with respect to the longitudinal and transverse planes. Thus, on swinging of the tool through an arc of 180°, no change of the interference contour of the toolhead arises. The toolhead can accordingly be used with magazines to the right or left of the cross or transverse slide. Because lengthy rotating tools, for example, drilling tools, can be laid down in a direction parallel with respect to the machine axis, no special limitations arise for the tool latitude during working in the transverse direction (x-axis).

In accordance with a further aspect of the invention, the journal arrangement for the rotating tool is directly mounted in the tool retainer or seat of the toolhead.

In accordance with yet another aspect of the invention, the journal arrangement for the driven tools is arranged in the tool carrier.

BRIEF DESCRIPTION OF THE DRAWING

The above and other objects, features and advantages will become apparent from the following description, reference being made to the accompanying drawing in which there are illustrated preferred embodiments of the invention is highly diagrammatic form.

In the drawing:

FIG. 1 is a schematic plan view of a toolhead with a tool carrier mounted thereon and a rotating tool, whose axis of rotation extends in the direction of the z-axis of the machine tool about which the workpiece is rotated;

FIG. 2 is a view similar to FIG. 1 with the toolhead having been rotated through an angle of 180° so that the tool axis now extends in the direction of the x-axis;

FIG. 3 is a schamatic view of a toolhead with a tool carrier and a cutter for lathe operations adapted to feed and extending in the direction of the x-axis;

FIG. 4 is a view similar to the arrangement according to FIG. 3 after rotation through an angle of 180° so that the tool extends in the direction of the z-axis;

SPECIFIC DESCRIPTION

Figure 5:
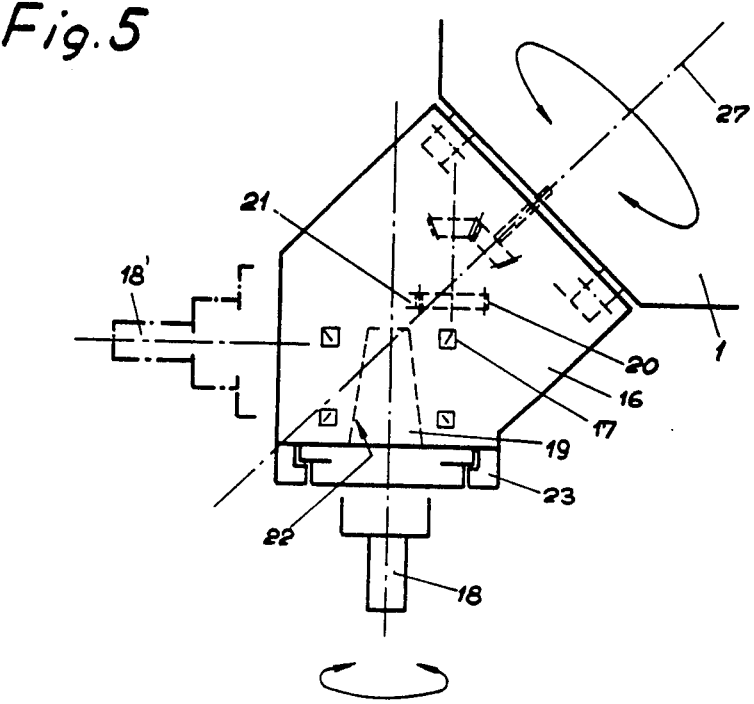
FIG. 5 is a schematic view of a toolhead for rotating tools with installed journal arrangement.

In general terms, a lathe is a machine for rotating a workpiece so as to enable a cutting tool to shape the workpiece into a component of circular cross section. Lathes, which are among the most important machine tools, vary widely in design. What they have in common is that the workpiece is given a rotational motion, and the material is cut away by a tool that is given an appropriate combination of linear, axial and radial movements.

The most widely used type is the center lathe, also known as the engine lathe, in which the work is held between centers or in a chuck. The rotational movement is imparted to the workpiece by the work spindle which is mounted in the headstock. Mounted on the guideways of the lathe bed is the saddle, or carriage, which carries the cutting tool and is constructed as a compound slide; the saddle itself moves in the longitudinal direction (z-axis) of the lathe, whereas the cross slide can be moved only in the transverse direction (x-axis). Mounted on the cross slide is the top slide which in turn carries the tool post in which the tool is held. In its normal position the top slide can be moved longitudinally; it can, however, also be swivelled about a vertical axis (y-axis) and clamped in any position, so that conically tapered surfaces can be machined.

In the following description of the preferred embodiments, the main or longitudinal axis of the machine is designated as the z-axis, and the horizontal transverse thereto is designated as the x-axis. This designation of the axes applies to all drawing figures.

On a tool slide 1 a toolhead or tool clamping head 2 is journaled in such a way that it can rotate about the axis 3. The toolhead 2 comprises a tool retainer or tool post 4 in which can be mounted and secured tools which are to be fixedly secured, as well as tools which are to be rotated.

FIG. 1 shows a tool carrier 5 with a rotating tool 6. The tool 6 is journaled, for example, by antifriction bearings, such as roller bearings 7. A transmission system is arranged in the interior space of the toolhead 2 which system imparts the torque of a drive motor, not shown, in the tool slide 1, for example, via two bevel gear wheels 8 and 9, as well as spur gear 10, to a pinion, bevel gear or similar driver 11 in the tool carrier 5. The pinion 11 is operatively connected to the cutting tool 6. As soon as the tool carrier 5 is removed, during an exchange or replacement of the tool, the pinion 11 is disengaged from the spur gear 10. Conversely, the pinion 11 meshes with the spur gear 10 as soon as the tool carrier 5 is inserted and clamped. Each tool holder or clamp, arranged in a tool magazine (chain magazine), not shown, and being driven, for example, with the tool slide which receives a rotating tool, is furnished with such a pinion 11 for operatively engaging or coupling the tool drive. While in the drawing figures a spur gear 10 and a pinion 11 is shown between a drive and a tool, for transmission of force, which transmission can also be disengaged, different arrangements may be provided which allow a desired transmission of torque or motive power and the associated disengagement of such power or force input.

When the toolhead 2 according to FIG. 1 is rotated through 180° about the axis 3, the tool 6 is swung from the longitudinal position (tool axis parallel to the main axis of the machine, z-axis) into the x-direction indicated in FIG. 2. Milling and drling operations can accordingly be carried out in the direction of both axes, and attention need not be given to a second tool arranged in the toolhead.

In a similar manner it is contemplated that a non-rotating of fixed tool 12 can be mounted with its tool holder or clamp 13 in the tool retainer 4, see FIG. 3. There is then no pinion provided for the spur gear 10 in the tool holder 13. FIG. 4 shows the tool 12 after a rotation or movement of the toolhead 2 through 180°. The spur gear 10 is shown in set-back position with respect to the tool retainer 4 in the drawing figures, and the pinion 11 is shown in a manner projecting over the tool carrier 5. Thus, a corresponding recess must be provided in the tool retainer 4 such that the tool carrier can be slid in.

When in an alternative embodiment the spur gear 10 projects beyond the plane of the tool retainer 4, no measures need be taken in the retainer 4, but corresponding recesses should be provided in the tool carrier 5 and the tool carrier or holder 13, so that the carriers can be slid in without collisions.

With respect to the entire arrangement being free from collisions, it is to be noted that aside from being skewed or inclined, the axis 3 passes through the line of intersection of the planes 14 and 15 of the tool holder or carrier. These surfaces merely exchange position on rotation or movement of the toolhead, so that the distances to neighboring machine components, especially with respect to a tool magazine for tool exchange, remain constant. The outer contour of the toolhead remains the same also upon rotation or movement. Thus, transfer slides are not required for exchange of tools between a magazine and a clamping head.

FIG. 5 shows a toolhead 16 which comprises in the interior space a tool retainer or tool post 22 with a fixed journal 17 for rotating tools 18. The tools 18 are not, in contrast to those shown in FIGS. 1 and 2, respectively arranged so as to be free to rotate in a tool holder, but are directly arranged in the clamping head or toolhead 16. FIG. 5 shows a tool centering cone 19 aside from the journal arrangement 17, as well as showing a spur gear 20, which is the equivalent of spur gear 10. The spur gear 20 meshes with the pinion 21 of the tool retainer or tool post 22. The tool retainer 22 of the toolhead 16 furthermore includes clamp elements 23 with which a tool holder 24, having a cutter or lathe tool 25, can be clamped, as an alternative to the rotating tool 18. The position of the tool holder 24 is defined by the positioning elements 26. Next the clamping is carried out by the clamp elements 23. Alternatively, clamping can be done in other ways as dictated by the circumstances at hand. The clamp elements 23 can be attached by bolts to the head and similar clamps, straddling the holder 13 or 15 can hold the selected tool holder on the head.

Figure 6:
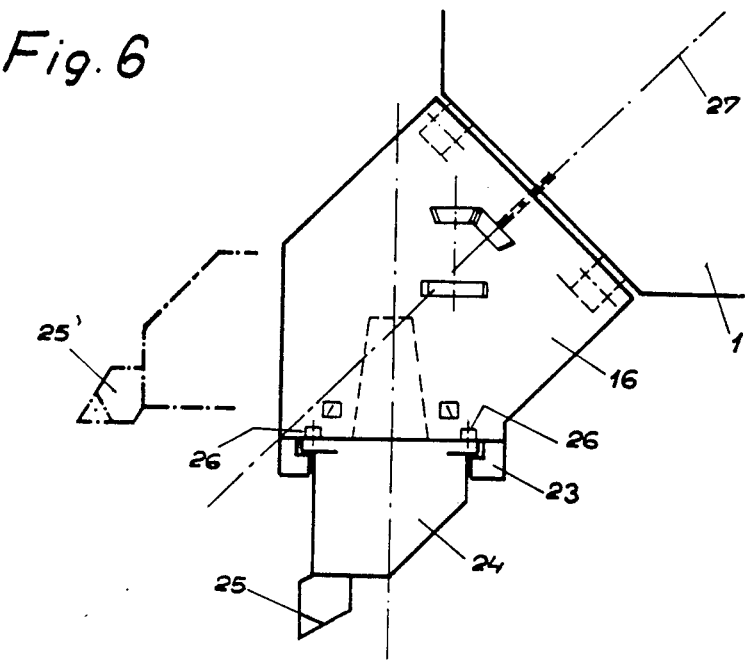
FIG. 6 is a view similar to FIG. 5 with a tool holder and a lathe cutter substituted for the rotatable tool of FIG. 5.

The positions of the tools 18 and 25 are shown in FIGS. 5 and 6 in dash-dot outline and by the reference numerals 18' and 25', after the rotation or movement of the toolhead 16 about the axis 27 through an angle of 180°. The relevant contours for the mounting or fastening of tool exchange or replacement devices of the toolhead are also not exceeded by a rotation of 180°, so that also in this embodiment a tool exchange can be carried out in a simple manner.

The basic advantage of this embodiment resides in the utilization of the frontal retainer or the like fastener seat for fixed as well as rotating tools. Thus, a single retainer is sufficient on a toolhead, whereby the danger of a collision, as it arises in toolheads with several tools, is substantially reduced.

It will be clear from the foregoing that the tool carrier 5 and the tool holder or clamp 13 may generically be referred to as a tool holder or tool retainer.

We claim:

1. A holder assembly for a lathe-type machine tool having a tool slide, comprising in combination;
    a toolhead connected to said tool slide and provided with a single seat and with drive gearing;
    a plurality of tool carriers selectively receivable in said seat and including:
        a tool carrier with a fixed tool and
        a tool carrier with a rotating tool,
        said tool carrier with said rotating tool including a gear connected to said rotating tool and meshing with said drive gearing when said tool carrier with said rotating tool is received in said seat;
        said seat being defined by at least one planar surface against which said tool carriers can be seated;
    means for mounting a selected one of said tool carriers against said surface; and
    means for mounting said toolhead for rotation about an axis at an angle of 45° to said surface relative to said slide and for fixing said toolhead about said axis at one of two positions angularly offset by 180°, each of said tool carriers having a tool axis oriented by selection of said positions parallel to a longitudinal axis or to a transverse axis of a workpiece on said machine tool, said tool axis of each carrier including an angle of 45° with said axis of rotation of said toolhead in both positions thereof when the respective tool carrier is mounted on said surface.

2. The holder assembly defined in claim 1 wherein said drive gearing includes a bevel gear journaled in said toolhead for rotation about said axis of rotation of said toolhead.

3. The assembly defined in claim 1, further comprising a direct journal arrangement in said tool head at said seat engageable with the selected rotatable tool.

4. The assembly defined in claim 1, further comprising a journal arrangement in said tool carrier for said rotating tool.

5. The holder assembly defined in claim 2 wherein each of said tool carriers is defined by a pair of surfaces at right angles to one another and adjoining at a corner to a tool carrier intersected by said axis of rotation of said toolhead when the respective tool carrier is mounted in said seat.

* * * * *